United States Patent [19]
Skanberg

[11] Patent Number: 5,725,243
[45] Date of Patent: Mar. 10, 1998

[54] GAS GENERATOR

[75] Inventor: Torbjorn Skanberg, Hovas, Sweden

[73] Assignee: Autoliv Development AB, Vargarda, Sweden

[21] Appl. No.: 554,774

[22] Filed: Nov. 7, 1995

[30] Foreign Application Priority Data

Nov. 8, 1994 [GB] United Kingdom ............... 9422521.6

[51] Int. Cl.[6] .................................................. B60R 21/26
[52] U.S. Cl. ...................................... 280/737; 280/741
[58] Field of Search .................................. 280/737, 741

[56] References Cited

U.S. PATENT DOCUMENTS

| | | | |
|---|---|---|---|
| 5,060,973 | 10/1991 | Giovanetti | 280/741 |
| 5,230,532 | 7/1993 | Blumenthal et al. | 280/741 |
| 5,263,740 | 11/1993 | Frey et al. | 280/737 |
| 5,345,876 | 9/1994 | Rose et al. | 280/737 |
| 5,542,704 | 8/1996 | Hamilton et al. | 280/741 |

FOREIGN PATENT DOCUMENTS 1 338 855  11/1973  United Kingdom.

*Primary Examiner*—Paul N. Dickson
*Attorney, Agent, or Firm*—Spencer & Frank

[57] ABSTRACT

A gas generator for generating gas for use in a vehicle safety device includes a pressure vessel containing a compressed gas including at least one oxidizing component, the pressure vessel having defined therein at least one opening which is normally closed and means to open the at least one opening in response to a signal including a duct leading from the at least one opening towards an outlet that communicates with the safety device, and a solid fuel located within the duct arranged to be oxidized with the oxidizing gas when the oxidizing gas passes through the duct after the opening has been opened, the solid fuel being in the form of a structure that is restrained within the duct.

22 Claims, 2 Drawing Sheets

FIG.

GAS GENERATOR

BACKGROUND OF THE INVENTION

1. Field of the Invention

THE PRESENT INVENTION relates to a gas generator and more particularly relates to a gas generator adapted for use with a safety device in a motor vehicle such as an air-bag pre-tensioner.

2. Description of the Related Art

It has been proposed previously to provide the gas generator which utilises a pyrotechnic charge to generate gas. Such gas is generally of a high temperature which may damage a safety device, such as an air-bag. It has also been proposed to use a gas generator which uses compressed gas contained within a bottle. When such compressed gas is released, the temperature will drop resulting in a relatively low volume.

It has thus been proposed to use a hybrid gas generator which utilises a compressed inert gas which is heated by the combustion products of a relatively small pyrotechnic charge to give a substantial volume of gas, but at a temperature lower than that of gas produced directly by a pyrotechnic gas generator. A further hybrid gas generator uses separate sources of compressed oxygen and compressed hydrogen which are subsequently combined to produce heat. In such a situation the oxidisable part and the oxidising part are gaseous.

If the gas generator includes a pyrotechnic charge of a substantial size, this may be considered potentially dangerous, since it may be ignited inadvertently. Gaseous fuel typically has a low energy per volume, and a similar comment applies to a gaseous fuel which is liquified, under high pressure, at normal temperatures. Such liquified gaseous fuels are also difficult to store.

British Patent Specification 1,338,855 discloses a gas generator for use in a motor vehicle in which carbon dioxide is stored in a liquid form in a tank. In response to a an impact sensor being activated, the carbon dioxide is permitted to vent from the tank, and subsequently a magnesium pyrotechnic composition, comprising a pyrotechnic powder, is exothermetically burned in a combustion chamber. The liquid carbon dioxide ejected from the carbon dioxide tank under pressure is flashed to a gas within the combustion chamber. The heat of vaporisation of the liquid carbon dioxide is supplied by the exothermic heat of combustion of the magnesium. The Specification teaches that the magnesium powder is blown from the combustion chamber into a large duct which in turn communicates with a restraint bag which is to be inflated. It would be extremely undesirable for burning magnesium powder to be introduced into an inflated restraint bag.

The present invention seeks to provide an improved gas generator.

SUMMARY OF THE INVENTION

According to this invention there is provided a gas generator for generating gas for use in a vehicle safety device, said gas generator comprising a pressure vessel containing a compressed gas, that gas incorporating at least an oxidising component, the pressure vessel having at least one normally closed opening, and means to open the opening in response to a signal, there being a duct leading from the opening towards an outlet that communicates with the safety device, there being a solid fuel located within the duct arranged to oxidise with the oxidising gas when the oxidising gas passes through the duct after the opening has been opened, the solid fuel being in the form of a structure that is restrained within the duct.

The gas generator may provide gas to an air-bag.

Preferably the pressure vessel contains a second component comprising inert gas, such as argon, or helium or a mixture of argon and helium.

The gas generator may be provided with means for igniting the solid fuel, which may be adapted to be activated when or after the opening has been opened.

Preferably the fuel comprises metal, such as steel, aluminium or magnesium. Advantageously, the fuel comprises magnesium and steel.

Conveniently the fuel has a high surface to volume ratio. As a consequence, nearly all of the fuel will be burnt 40 ms after ignition.

In preferred embodiments the fuel is structured like metal wool, or as sintered grains that form a porous structure.

Preferably the fuel comprises two metals, the metal which is easier to ignite being located closer to the means to ignite the fuel.

In one embodiment the fuel comprises magnesium wool located close to the means to ignite the fuel, and steel wool.

Preferably the means to ignite the fuel comprise a pyrotechnic squib.

Alternatively the means to ignite the fuel comprise electrode means to apply an electric current to the fuel.

Preferably two means are provided for igniting the fuel, one being upstream and one being downstream.

Conveniently the outlet is provided with a ceramic filter.

Preferably the said opening is sealed by a foil or the like, a piston being located adjacent the opening to retain the foil in position, means being provided to move the piston in response to a triggering signal to cause the opening to open.

In one embodiment pyrotechnic means are provided to generate gas to move the piston in response to a triggering signal.

In an alternative embodiment solenoid means are provided to move the piston in response to a triggering signal.

BRIEF DESCRIPTION OF THE DRAWINGS

In order that the invention may be more readily understood, and so that further features thereof may be appreciated, the invention will now be described, by way of example, with reference to the accompanying drawings in which.

DESCRIPTION OF THE PREFERRED EMBODIMENT

Figure 1:
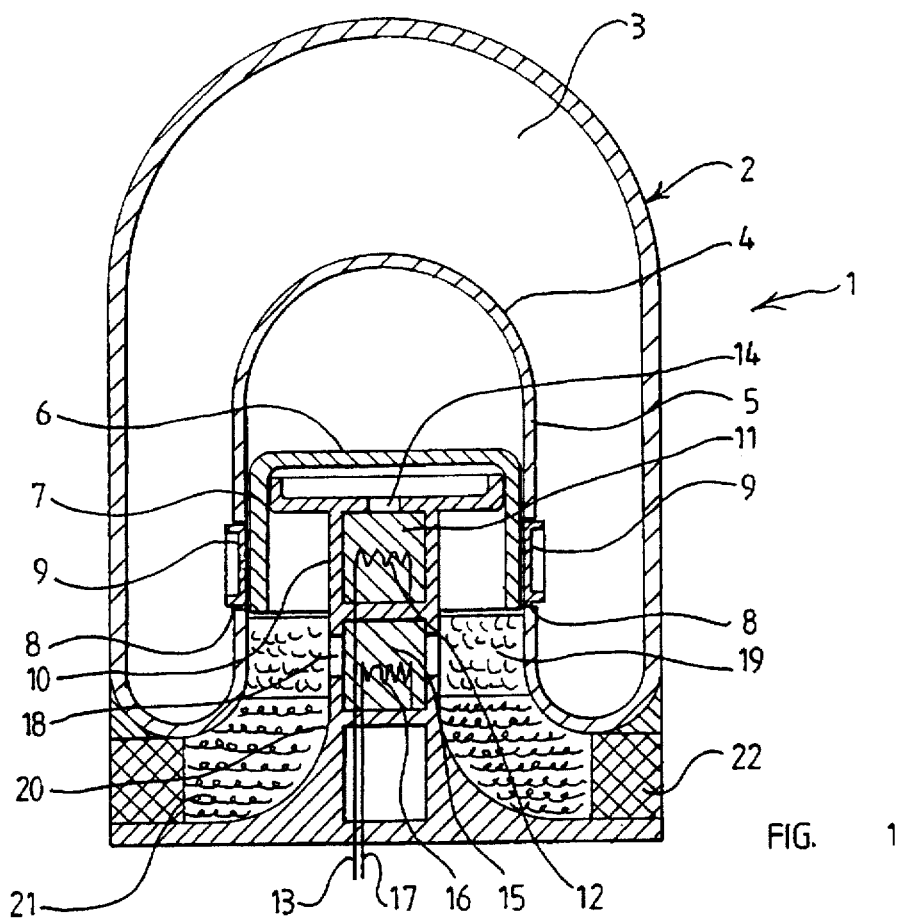
FIG. 1 is a sectional view of one embodiment of a gas generator in accordance with the invention in an initial condition.

Referring initially to FIG. 1 of the accompanying drawings, a gas generator comprises a housing 1. The housing 1 defines a bottle 2 which contains a compressed gas 3, that compressed gas comprising a mixture of oxygen, argon and helium.

A part 4 of the bottle 2 is of re-entrant form defining a cylindrical portion 5. Contained within the cylindrical portion 5, that is to say on the exterior of the bottle 2 but within the re-entrant cylindrical portion, is a piston 6, a piston 6 having a peripheral skirt or flange 7 which lies immediately adjacent the cylindrical part 5 of the bottle 2.

In an initial position the skirt 7 of the piston lies adjacent apertures 8 which are formed within the cylindrical portion 5 of the bottle 2. Received within each aperture 8 is a disc 9 of a rupturable material, such as a relatively thin aluminium foil. Thin aluminium foil seals the apertures 8. The periphery of the foil may be welded or adhered to the aperture 8. The compressed gas 3 within the bottle 2 presses each foil disc against the skirt 7 of the piston 6.

A core support 10 is located within the hollow central portion of the piston 6 and is a substantially sealed, but slidably, fit within the skirt 7 of the piston 6. The core support 10 defines a cavity 11 in which is provided a pyrotechnic charge having an electrical igniter 12 which igniter is connected to a lead 13. An aperture 14 is provided to establish communication between the pyrotechnic charge 11 and the hollow central portion of the piston 6.

Located within the core support 10, beneath the pyrotechnic charge 11 is a further pyrotechnic charge 15 within its own cavity, the pyrotechnic charge 15 being associated with an electric igniter 16 connected to a lead 17. Apertures 18 extend substantially radially from the pyrotechnic charge 15 and communicate directly with magnesium wool 19 which surrounds the core support 10. The magnesium wool 19 is in an annular duct 20 which surrounds the core support 10 and which communicates with the apertures 8 of the bottle 2 and with a diverging annular passage portion which contains steel wool 21. At the outlet end of the diverging annular passage portion containing steel wool is a ceramic filter 22. Any gas passing through the filter 21 is directed to a safety device, such as an air-bag.

In operation of the gas generator illustrated in FIG. 1, initially an electric current is supplied by a lead 13 to the electric igniter 12 which ignites the pyrotechnic charge 11. Gas is generated and passes through the aperture 14. The gas is directed to a chamber which is effectively defined between the top of the core support 10 and the under-surface of the piston 6, thus driving the piston 6 upwardly. As the piston 6 moves upwardly the skirt 7 is moved away from the apertures 8. The pressure of gas 3 within the bottle 2 thus ruptures the foil discs 9, permitting compressed gas 3 to flow through the apertures 8. The gas commences to flow through the magnesium wool 19 which surrounds the core 10 and then flows through the steel wool 21 towards the ceramic filter 22.

At this moment an electric current is applied to the lead 17, thus flowing through the electrical igniter 16 and igniting the second pyrotechnic charge 15. The flame of the pyrotechnic charge 15 passes radially outwardly through the apertures 18 and ignites the magnesium wool 19. Oxygen present within the compressed gas 3 is intimately mixed with the magnesium wool which thus oxides rapidly. The steel wool 21 is ignited by the burning magnesium wool and also oxides. Both the magnesium and the steel burn giving off substantial quantities of heat. Magnesium wool has proved to be easier to ignite than steel wool, and thus the magnesium wool is located near the pyrotechnic charge 15. The magnesium wool, when ignited, burns at a high temperature and will ignite the steel or iron wool. The heat from the burning magnesium wool or steel wool serves to expand the gas coming from the bottle 2. The expanded gas flows through the ceramic filter 21, which serves to prevent any hot ash from the magnesium wool or from the iron wool emerging from the described gas generator. The gas emerging through the ceramic filter 21 may be directed to inflate an air-bag or to activate a safety device.

The magnesium is ideally present in the form of magnesium wool. Alternatively, a structure comprising sintered grains may be used to burn with sufficient rapidity the fuel, i.e. the magnesium, must have a very large surface to volume ratio. Thus, the magnesium should be in a porous form with open pores or passages through it.

Similarly, it is preferred to use steel wool or iron wool for the same reason, that is to say so that the steel or iron will have a large surface to volume ratio.

The solid fuel, that is to say the magnesium and the steel, is in the form of a structure that is retained within the duct. The magnesium or steel wool is a relatively rigid structure, which engages the duct, and which is thus restrained within the duct. When gas flows through the duct the magnesium or steel remains in position within the duct, and does not tend to move out of the duct. The same is true of a structure comprising sintered grains.

It would also be possible to use aluminium as a fuel or carbon. Such materials should also be presented in a porous form with a large surface to volume ratio.

In the various alternative arrangements mentioned above, substantially all of the fuel will be burnt by approximately 40 ms after initial ignition.

The compressed gas may comprise pure oxygen, but preferably includes argon, because argon has good heat-absorbing properties and the gas preferably includes helium, since it is relatively easy to detect a leak when the gas that is leaking incorporates helium.

Whilst in the described embodiment two pyrotechnic charges are provided, one being provided primarily to move the piston 6, and the other being primarily to ignite the fuel, it is to be envisaged that in a modified embodiment of the invention only one pyrotechnic charge need be provided, which could perform both functions.

Alternatively, the magnesium wool could be ignited by passing an electric current directly through the magnesium wool, or in some other convenient way.

Figure 2:
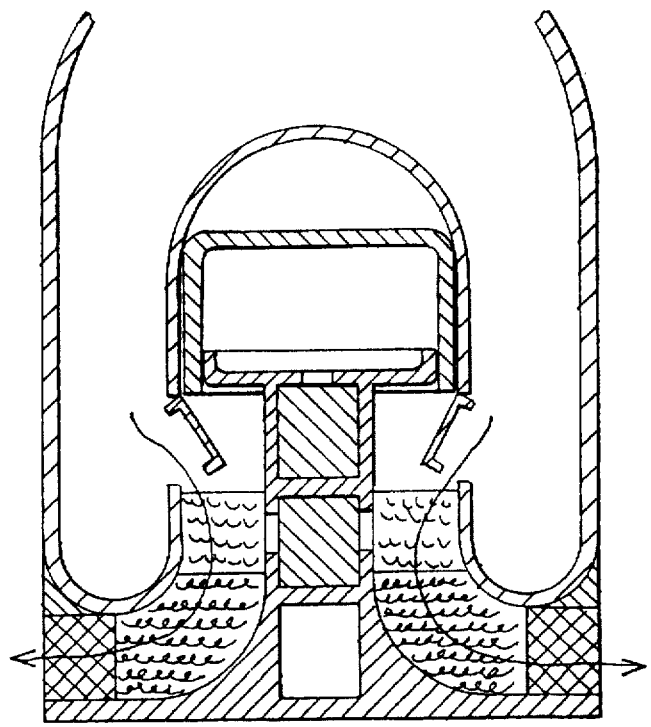
FIG. 2 is a view corresponding to FIG. 1 showing the gas generator in an operational condition.
Figure 3:
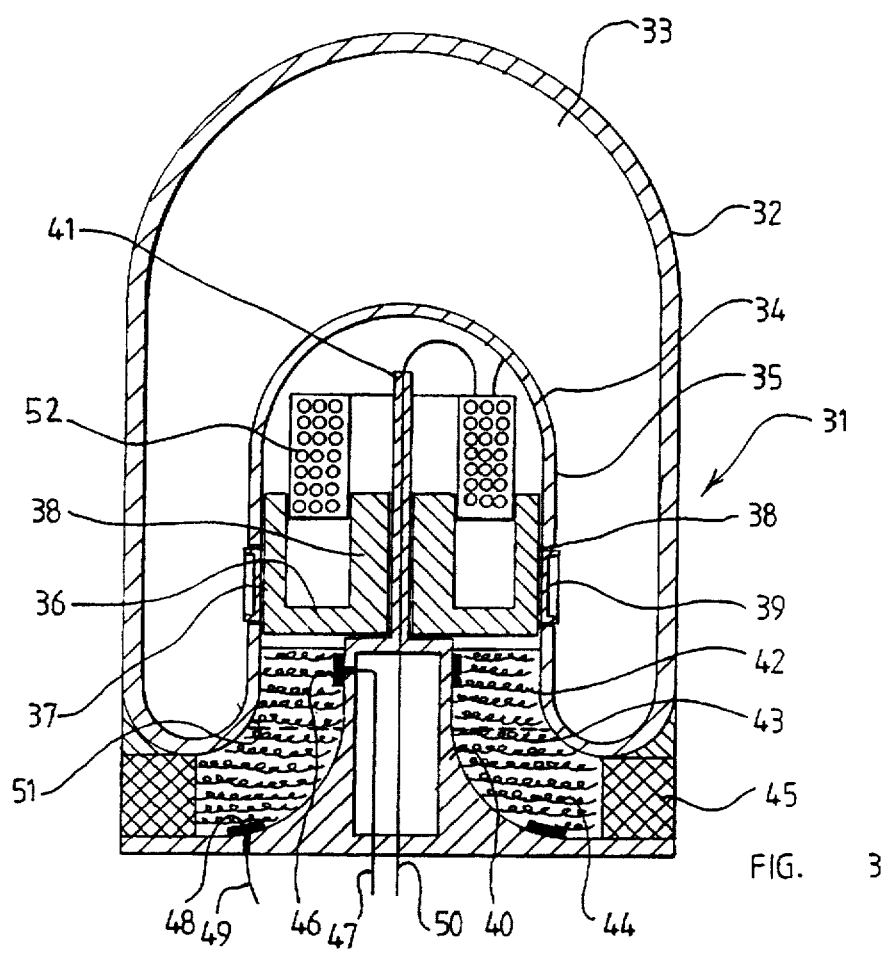
FIG. 3 is a sectional view of a second embodiment of an invention in an initial condition.
Figure 4:
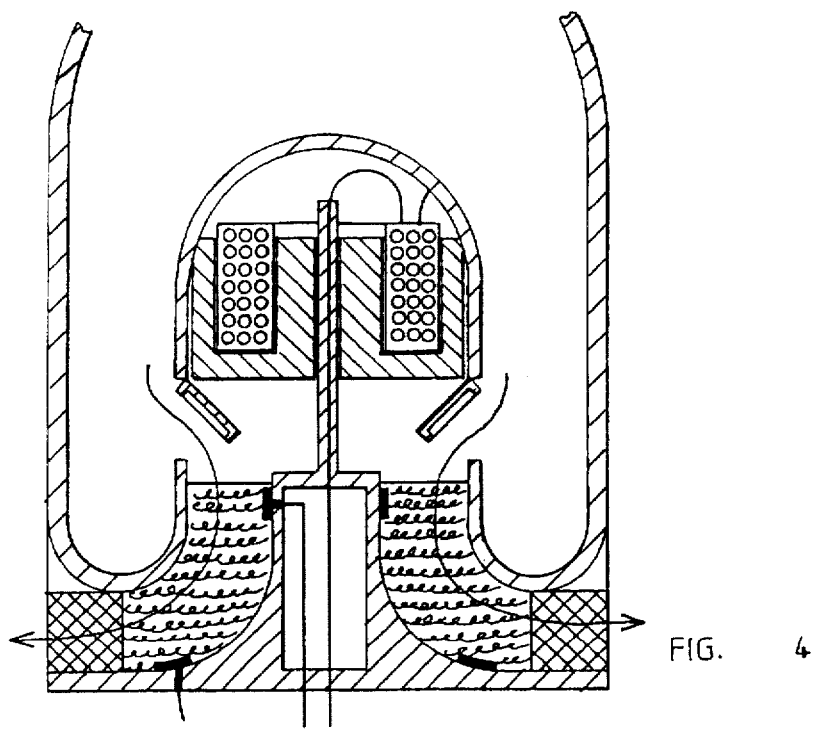
FIG. 4 is a sectional view of the embodiment of FIG. 3 when in an operational condition.

FIGS. 3 and 4 illustrate a modified embodiment of the invention, although, as will be immediately apparent, certain features are identical with the embodiment of FIGS. 1 and 2.

Referring now to FIGS. 3 and 4, in the illustrated embodiment of the invention a gas generator 31 comprises a bottle 32 containing compressed gas 33, that gas comprising preferably a mixture of oxygen, argon and helium. A re-entrant portion 34 of the gas bottle 32 defines a cylindrical portion 35. A piston 36 is contained within the cylindrical part of the re-entrant portion 34, the piston 36 having a peripheral skirt 37. The skirt 37 lies immediately adjacent apertures 38 formed in the cylindrical portion 34, each aperture 38 being sealed by a disc 39 of an easily broken material such as, for example, aluminum foil. The piston 36 has a central projecting core 38 formed, for example, of soft iron. The core is partly received within an electric coil 52 that forms a solenoid 52.

A central guide support 40 is provided having a portion 41 that extends upwardly through a channel provided through the core 38 of the piston 36. Surrounding the main part of the guide support 40 is an annular duct 42, which diverges outwardly and which contains steel wool 43,44. There may be a barrier 51 located in the duct between an upper part 43 of the steel wool and a lower part 44 of the steel wool. The open end of the duct 42 is closed by a ceramic filter 45.

Electrodes 46 are provided in contact with the upper part of the steel wool within the annular duct 42, and connected to a lead 47 and further electrodes 48 are provided in contact with the lower part 44 of the steel wool in the diverging part of the duct, connected to leads 49. A further lead 50 extends through the guide 40 and leads to the solenoid coil 52.

In operation of the gas generator shown in FIG. 3, initially an electric current is applied to the lead 50, activating the solenoid 52. The core 38 is drawn up into the solenoid 52 thus moving the piston 36 from the initial position illustrated in FIG. 3 to a terminal position illustrated in FIG. 4. It can be seen that the peripheral skirt 37 of the piston 36 is moved away from the apertures 38 thus permitting the aluminium foil discs 39 to rupture. Compressed gas 33 from within the bottle 32 flows past the guide support 40 and through the annular duct 42 containing the steel wool 43,44. A potential may then be applied to the lead 47 and thus to the electrodes 46. That potential flows through the upper part of the steel wool 43, thus igniting the steel wool. The steel wool burns, oxidising in the oxygen flowing through the steel wool from the interior of the compressed gas bottle 32. The burning of the steel wool will spread quickly downstream due to the flow of hot oxidising gas from the bottle 32. The heat from the burning steel serves to increase the volume of the gas from the compressed gas bottle 32. The ceramic filter 45 prevents any particles of ash from the combustion process leaving the gas generator. The gas leaving the gas generator may be directed to an air-bag or to a pre-tensioner or other safety device.

It is to be appreciated that instead of passing a current through the lead 47 to the electrodes 46, a current could, alternatively, be passed through the lead 49 to the electrodes 48. In such a situation only the lower part 44 of the steel wool will be ignited initially. The burning will propagate very slowly upstream against the flow of cool oxidising gas. The heating of the gas will be more spread out in time resulting in a slower, softer filling of the bag. If a barrier 51 is used that will stop propagation of burning upstream (not downstream), the gas entering the bag will have less volume. This may be desirable if the air-bag is only to be partially inflated, for example, if an appropriate sensor has determined that an occupant of a vehicle is not in the correct position for the air-bag to be fully inflated, but instead is sitting in a more forward position.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A gas generator for generating gas for use in a vehicle safety device, comprising:

a pressure vessel containing a compressed gas including at least one oxidizing gas, the pressure vessel having defined therein at least one opening which is normally closed; and means to open the at least one opening in response to a signal including (a) a duct leading from the at least one opening towards an outlet for communicating with a vehicle safety device, and (b) a solid fuel located within the duct arranged to be oxidized with the at least one oxidizing gas when the at least one oxidizing gas passes through the duct after the opening has been opened, the solid fuel being in the form of a structure that is restrained within the duct.

2. The gas generator according to claim 1, wherein the vehicle safety device is an air bag, and wherein the gas generator is adapted to provide gas to the air-bag.

3. The gas generator according to claim 1, wherein the compressed gas further comprises at least one inert gas.

4. The gas generator according to claim 3, wherein the at least one inert gas comprises argon.

5. The gas generator according to claim 3, wherein the at least one inert gas comprises helium.

6. The gas generator according to claim 3, wherein the at least one inert gas comprises a mixture of argon and helium.

7. The gas generator according to claim 1, further comprising means for igniting the solid fuel.

8. The gas generator according to claim 7, wherein the means for igniting the solid fuel is adapted to be activated when the at least one opening has been opened.

9. The gas generator according to claim 1, wherein the solid fuel comprises at least one metal.

10. The gas generator according to claim 9, wherein the solid fuel is at least one metal selected from the group consisting of steel, aluminum and magnesium.

11. The gas generator according to claim 9, wherein the solid fuel comprises magnesium and steel.

12. The gas generator according to claim 1, wherein the solid fuel has a high surface to volume ratio.

13. The gas generator according to claim 12, wherein the solid fuel has a metal wool structure.

14. The gas generator according to claim 9, wherein the solid fuel comprises two metals one of which two metals ignites easier than the other of the two metals, the metal which is easier to ignite being located closer to the means to ignite the solid fuel.

15. The gas generator according to claim 13, wherein the solid fuel comprises magnesium wool located close to the means to ignite the fuel, and steel wool.

16. The gas generator according to claim 7, wherein the means to ignite the fuel comprise a pyrotechnic squib.

17. The gas generator according to claim 7, wherein the means to ignite the fuel comprise electrode means to apply an electric current to the solid fuel.

18. The gas generator according to claim 7, wherein two means are provided for igniting the solid fuel and are positioned respectively in contact with an upper part of the solid fuel and a lower part of the solid fuel.

19. The gas generator according to claim 1, wherein the outlet is provided with a ceramic filter.

20. The gas generator according to claim 1, further comprising:

a disc provided on the at least one opening whereby the at least one opening is sealed, a piston located adjacent the at least one opening to retain the at least one disc in position, and means to move the piston in response to a triggering signal to cause the at least one opening to open by rupturing the at least one disc.

21. The gas generator according to claim 20, wherein pyrotechnic means are provided to generate gas to move the piston in response to a triggering signal.

22. The gas generator according to claim 20, wherein solenoid means are provided to move the piston in response to a triggering signal.

* * * * *